Dec. 4, 1945.　　　　J. E. BECKWITH　　　　2,390,289
SELF ALIGNING PISTON
Filed Sept. 25, 1944
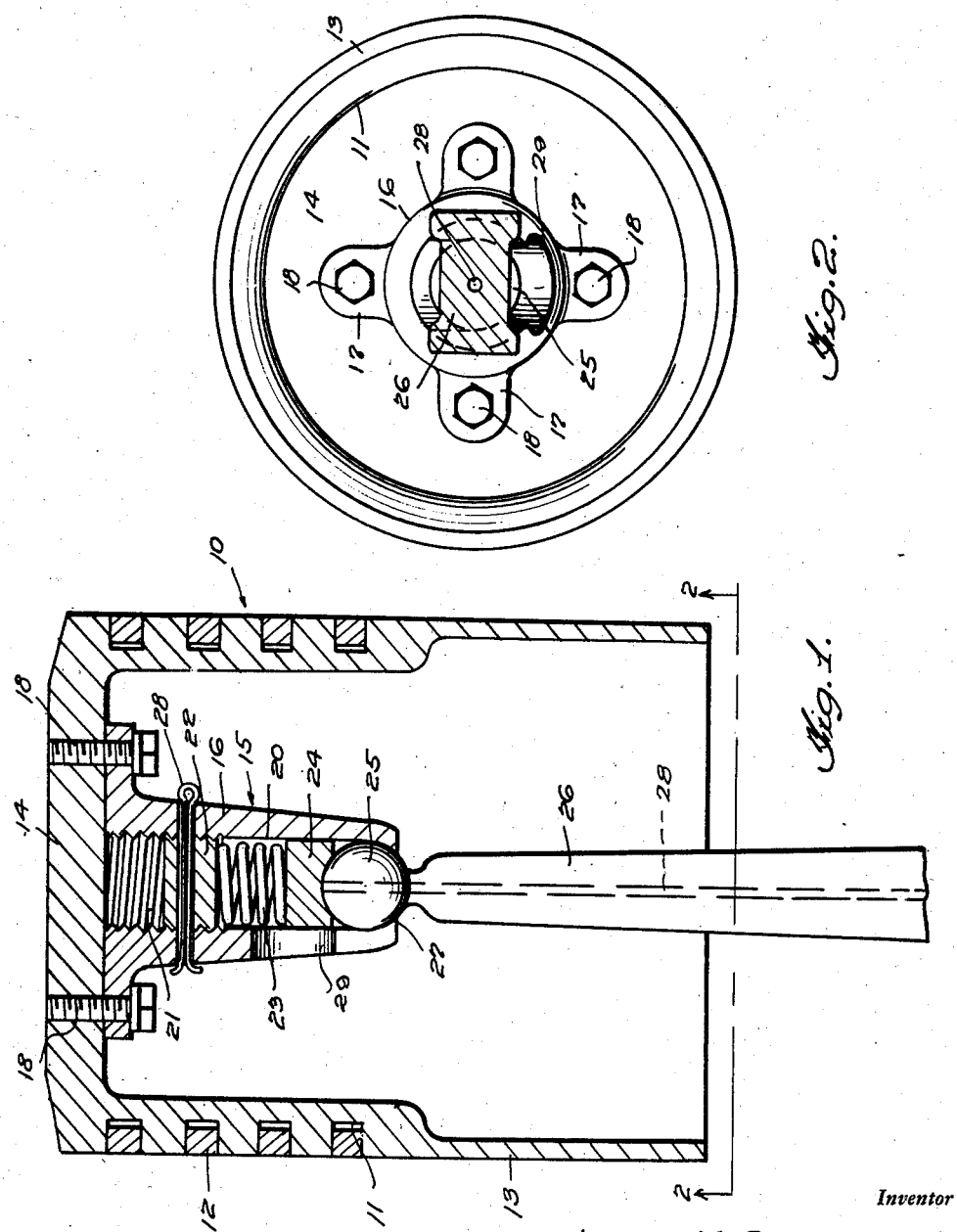
Inventor
JAMES E. BECKWITH,
By Clarence A. O'Brien
and Harvey B. Jacobson
Attorneys Patented Dec. 4, 1945

2,390,289

UNITED STATES PATENT OFFICE 2,390,289

SELF-ALIGNING PISTON

James E. Beckwith, Kosmos, Wash.

Application September 25, 1944, Serial No. 555,675

1 Claim. (Cl. 309—20)

This invention relates to a self-aligning piston and more particularly to such a piston adapted to be used in conjunction with internal combustion engines.

A primary object of this invention is the provision of an improved piston which will automatically align itself with the cylinder walls and the crank shaft, to preclude uneven wear on the piston or the cylinder.

An additional object is the provision of such a piston which may rotate freely in the cylinder in order to compensate for unequal wear, should such occur, on the cylinder walls.

Still another object is the provision of such a piston which will enhance the motor efficiency of an internal combustion motor, provide a more smoothly running motor, and increase the life of the cylinders.

Still another object is the provision of such a piston which will be reliable and efficient in operation, sturdy and durable in construction, and relatively simple and inexpensive to manufacture.

An additional object is the provision of an attachment, which will readily adapt any piston now in use to increased efficiency and smoothness in operation in accordance with the foregoing objects.

Other objects will in part be obvious and in part be pointed out as the description proceeds, and shown in the accompanying drawing, wherein there is illustrated a preferred embodiment of this inventive concept.

In the drawing:

Figure 1 is a sectional view taken through the side wall of a piston, along the center line disclosing an embodiment of this invention, and Figure 2 is a sectional view taken substantially along the line 2—2 of Figure 1, as viewed in the direction indicated by the arrows.

Like reference numerals refer to like parts throughout the several views of the drawing.

Having particular reference now to the drawing, there is generally indicated at 10 a piston comprised of a piston wall 11, the customary piston rings 12, a skirt 13 and a head 14.

A bearing member generally indicated at 15 is comprised of a central sleeve portion 16, provided with extending lugs 17, through suitable apertures in which pass headed bolts 18 adapted to engage in suitable threaded recesses in the head 14 of piston 10 to secure the bearing member in related assembly therewith.

Bearing member 15 is provided with an internal bore 20 threaded as at 21 in its upper portion, within which threaded portion a threaded spring plug 22 is adapted to engage. A heavy duty compression spring 23 is adapted to be positioned between spring plug 22 and a socket cap 24, slidable within the smooth portion of bore 20. Socket cap 24 is provided with a spherical depression in its lower face, adapted to abut the ball head 25 of a connecting rod 26 provided with a centrally disposed hole 28 extending longitudinally therethrough to furnish lubricant to the bolt and socket. Bore 20 may be inwardly tapered as at 27 to hold the ball socket in related assembly therewith. A slotted aperture 29 is cut in the side wall of sleeve 16 to permit assembly of the ball head and connecting rod therewith.

In assembling the device the piston is first inserted in the sleeve, through aperture 29 following which the socket cap 24 and spring 23 are inserted in the top of the sleeve and spring 23 is adjusted to the requisite compression by spring cap 22. Spring cap 22 is then secured in position as by a cotter pin 28 passed through suitable aligned apertures in the cap and bearing member 15, and the bearing member bolted to the piston head.

Now from the foregoing, it will be seen that any possible disalignment of the piston within the cylinder is adapted to be compensated for by the compression spring 23 acting upon the ball and socket joint comprised of ball 25 seated within flange or taper 27.

It will also be seen that the piston is free to rotate about the above-mentioned ball and socket joint should inequalities appear on the interior surface of the cylinder, and that its tendency, due to the aforementioned spring-pressure would be to align itself to overcome such inequalities in the cylinder wall.

From the foregoing it will now be seen that there is herein provided a self-aligning piston accomplishing all the objects of this invention and others including many advantages of great practical utility and commercial importance, and characterized particularly by simplicity of construction and assembly, which may be readily attached within any existing piston.

As many embodiments may be made of this inventive concept, and as many modifications may be made in the embodiment hereinbefore shown and described, it is to be understood that all matter herein is to be interpreted merely as illustrative and not in a limiting sense.

I claim:

In a device of the character described, a piston, a connecting rod, a bearing detachably secured within said piston and having a bore therein, threads in the upper portion of said bore, means forming a socket at the extremity of said bore, means forming a keyhole aperture in the side wall of said bearing and extending into said socket, a ball head on said connecting rod adapted to be passed through said aperture and seat in said socket, said socket being tapered at its extremity to a diameter less than that of said ball, resilient means in said bore biasing said ball outwardly with respect to said socket, said resilient means comprising a spring plug threadedly engaging in said threaded portion of said bore, a socket cap slidable in the smooth portion of said bore, and a compression spring therebetween, and means including a cotter pin passed through registering apertures in said plug and the walls of said bore for securing said plug against rotation in said threaded portion of said bore.

JAMES E. BECKWITH.